Oct. 2, 1956      W. P. SCHMITTER      2,765,053
SHAFT SUPPORT AND REVERSE ROTATION UNIT
Filed March 10, 1950      3 Sheets-Sheet 1

Inventor
WALTER P. SCHMITTER
Miles Kenninger
Attorney

Oct. 2, 1956  W. P. SCHMITTER  2,765,053
SHAFT SUPPORT AND REVERSE ROTATION UNIT
Filed March 10, 1950  3 Sheets-Sheet 2

Inventor
WALTER P. SCHMITTER
By Miles Kenninger
Attorney

Oct. 2, 1956

W. P. SCHMITTER 2,765,053

SHAFT SUPPORT AND REVERSE ROTATION UNIT

Filed March 10, 1950

Inventor
WALTER P. SCHMITTER
By
Miles Kenninger
Attorney

United States Patent Office 2,765,053
Patented Oct. 2, 1956

2,765,053

SHAFT SUPPORT AND REVERSE ROTATION UNIT

Walter P. Schmitter, Milwaukee, Wis., assignor to The Falk Corporation, Milwaukee, Wis., a corporation of Wisconsin Application March 10, 1950, Serial No. 148,936

2 Claims. (Cl. 188—82.8)

This invention relates to improvements in devices for preventing "back-run" or reverse rotation of power driven machinery, and particularly to "back-stop" or one-way brake mechanisms incorporated in a gear assembly for driving machines.

This application is a continuation-in-part of application Serial No. 90,104, filed April 28, 1949, now abandoned.

The reverse rotation of some machine operations may cause serious damage to the machines or to the material being worked and may result in serious delays in production. Such reverse rotation should be positively prevented but without subjecting the gear assembly or the mechanism driven thereby to shocks or excess wear. The "back-run" device should be substantially free from the shaft when rotating in the desired or given direction to avoid a drag on the shaft and wear on the back-stop mechanism.

It is, therefore, one object of the present invention to provide a back-stop mechanism combined with a gear assembly and with the minimum of change in such assembly from its prior construction.

Another object is to structurally combine a shaft support and backstop mechanism in such manner as to improve the functioning and reliability of the latter.

Objects and advantages other than those above set forth will be apparent from the following description when read in connection with the accompanying drawing in which.

Figure 1:
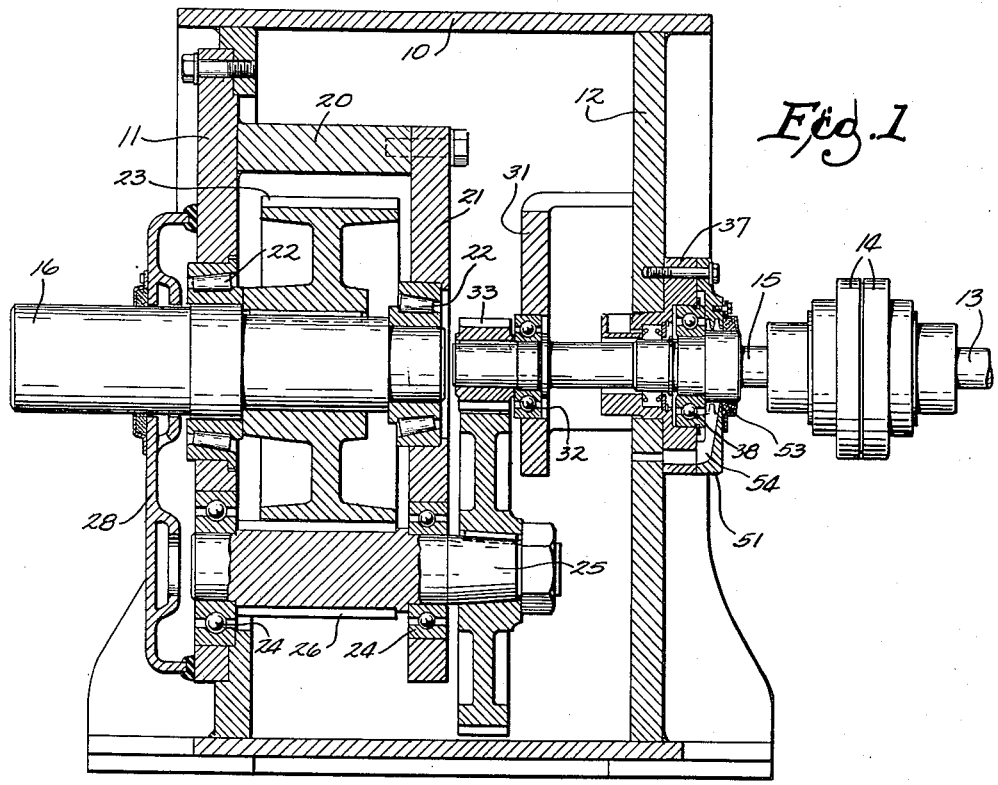
Fig. 1 is a vertical longitudinal section through a gear set assembly having one embodiment of the present back-stop combined therewith.

Generally, the present invention presents a gear set combined with a back-stop so related to the gear set parts as to be applicable to a known gear set construction merely by associating a back-stop assembly with one of the bearings in such gear set. The back-stop is shown herein in two materially different embodiments, the first embodiment including two modifications severally comprising a number of substantially rectangular blocks fulcrumed on one another and rocking between a surface of a fixed casing and a surface of a rotating shaft. Two side surfaces of the blocks are convex on different radii for locking, respectively, on the casing and the shaft surfaces. The third side surface of the blocks is a single plane while the fourth side surface (the side opposite to the third side surface of such blocks), has two plane surface portions at an angle to the third side to form an edge bearing on the third or single plane side of an adjacent block.

One of the third side surfaces of each block is wider than the other third side surface so that the blocks may be rocked into position to jam between the casing and the shaft, and means are provided to secure such rocking of the blocks into jamming position, upon rotation of the shaft in the direction reverse from a given direction.

The second embodiment of the back-stop includes a fixed casing, a sleeve fixed on and extending about the shaft and a helical spring expansible between the casing and sleeve and the shaft. A second spring contacts with the shaft sleeve only and slides freely thereon so long as the shaft rotates in a given direction. However, when shaft rotation is reversed, the second spring expands and acts on the first spring to cause expansion thereof into contact with the fixed casing and the shaft sleeve. (The "given" direction of rotation is shown by arrows applied to the several figures.)

Referring more particularly to the drawings in which like numerals are applied to like parts, 10 designates a housing having one removable end wall 11 and one fixed end wall 12, for enclosing a gear assembly receiving power from a drive shaft 13. The drive shaft 13 is coupled at 14 with a shaft 15 of the gear set and power is supplied to a machine to be driven (and not shown) by a shaft 16. The removable end wall 11 has fixed thereon spacers 20 on which is mounted a plate 21, the end wall 11 and the plate 21 having two sets of alined openings for receiving bearings. Bearings 22 support shaft 16 on which is mounted a gear 23 and bearings 24 support a shaft 25 on which are mounted gears 26 and 27. The gear 26 meshes with the gear 23 on one side of the plate 21 and the gear 27 is overhung from the other side of the plate 21. Leakage of lubricant from the housing through the bearings in the end wall 11, is prevented by a sealing plate assembly 28 fixed on such end wall.

The fixed end wall 12 has a bracket 31 secured thereon, the end wall and the bracket having an alined set of apertures for respectively receiving a back-stop assembly to be described and a bearing 32 in which shaft 15 is rotatably journalled at one end. The shaft 15 has fixed thereon a gear 33 meshing with gear 27.

Figure 2:
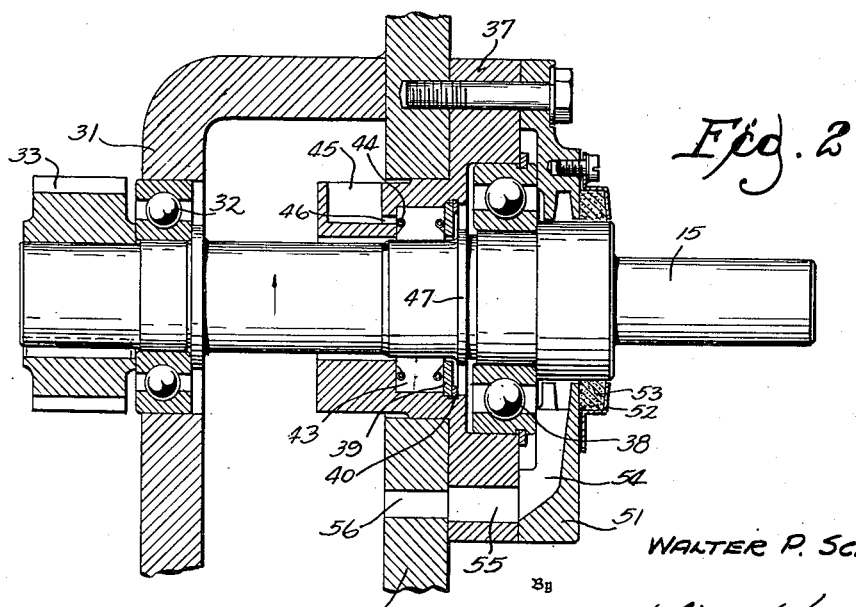
Fig. 2 is an enlarged fragment of Fig. 1 showing the back-stop construction of Fig. 1, in detail.
Figure 4:
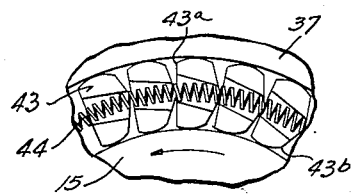
Fig. 4 is an enlarged end view of some of the elements shown in the preceding figures, for effecting one-way brake action.
Figure 3:
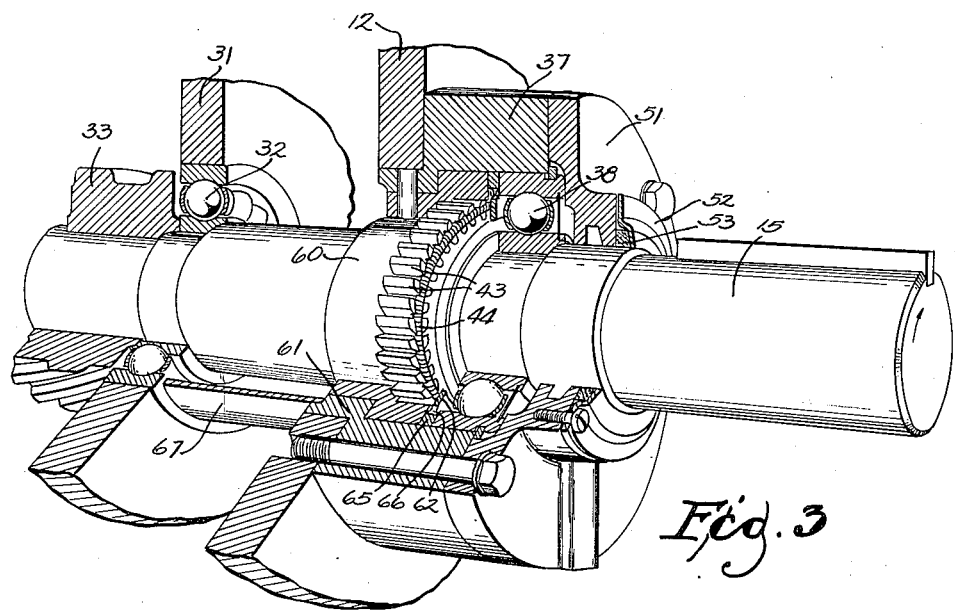
Fig. 3 is a perspective view, partially in section, of a back-stop structure differing in some respects from that shown in Figs. 1 and 2.

Referring now to Figs. 2, 3 and 4, the aperture in the fixed end wall 12 has mounted therein a casing 37 with a circular opening therethrough alined with the aperture in the bracket 31. A bearing 38 is mounted in one portion of said aperture in the casing 37 and coacts with bearing 32 in supporting shaft 15. Another adjacent portion of said circular opening is partially separated from said first named portion by a circular plate 39, held in place by a snap ring, 40, to form an annular chamber encircling the shaft 15. Such chamber provides inner and outer raceways and receives a plurality of block-like elements 43 which coacts with said raceways to form the backstop mechanism.

The elements 43 are generally substantially rectangular with one side providing a relatively narrow bearing surface extending longitudinally of the blocks, which bearing surface engages the plane side surface of an adjacent element and provides for fulcruming of the elements on one another. The edges of the blocks are rounded for rocking on the casing surface forming the outer raceway and on the shaft surface forming the inner raceway or contact surfaces for such blocks. Each of the block elements is grooved at each end to receive means for actuating the blocks upon reverse rotation of the shaft by maintaining the blocks in contact with one another and in contact with their raceways at all times. Such means comprises endless helical tension springs 44 extending through the substantially circular groove formed from the end to end positioning of the grooves in the ends of the several block elements.

One side of casing 37 projects into gear housing 10, 11, 12 and is formed with a cup 45 connected by a passage 46 with the chamber receiving the back-stop elements 43 and their contact-maintaining springs 44. Oil splashed inside the gear set housing, is caught by the cup 45 and drained therefrom to the back-stop chamber where some of the oil is retained by the plate 39. The remainder of the oil flows over the edge of the plate 39 and is splashed, by a flange 47 on shaft 15, about inside the portion of the casing 37 receiving bearing 38, for lubrication of the bearing.

The exterior end of the back-stop casing 37 is provided with a plate 51 on which is mounted a retainer 52 for oil absorbing packing 53 pressed on the shaft 15 to prevent movement of abrasive material along the shaft and into the back-stop casing, and leakage of lubricant therefrom. Oil drains from the bearing 38 by way of a passage 54 in plate 51, passage 55 in back-stop casing 37 and a passage 56 through the gear set end wall 12 and back into the gear set housing.

In operation, with the elements 43 positioned as shown in Fig. 4, so long as shaft 15 rotates in the given or clockwise direction, elements 43 fulcrum on one another and rock freely on their curved edge surfaces on the inner and outer raceways. However, if shaft 15 tends to rotate in the counter-clockwise direction, the elements 43 rock to bring their edges 43a and 43b into contact with the inner and outer raceways, respectively, thus locking shaft 15 to back-stop casing 37 and preventing reverse rotation of such shaft. It will be noted that the bearing 38, seated in the encircling outboard portion of the circular opening in the casing 37, reacts on and through the otherwise radially free adjacent portion of the shaft 15 to effect and accurately maintain a concentric relation between the shaft, the adjacent set of backstop elements 43, and the outer raceway encircling the latter, to thereby insure proper functioning of the latter.

Figure 5:
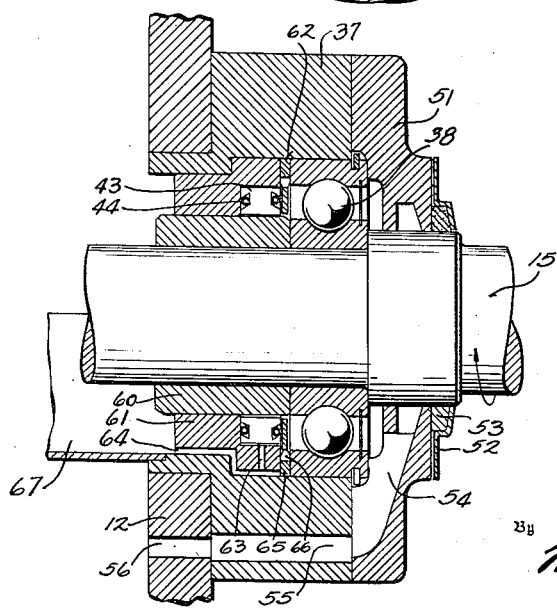
Fig. 5 is a fragmentary view of a portion of the structure shown in Fig. 3.

Referring now to Fig. 5 illustrating a relatively slight modification of the back-stop embodiment above described, the form of the back-stop casing 37 is modified to receive both the bearing 38 and two sleeves 60 and 61 fixed to the shaft 15 and casing 37, respectively, and coacting with each other and with end plate 62 to form a chamber enclosing blocks 43 and their connecting springs 44. It will be noted that, as in the modification first above described, the bearing 38 is disposed in an outboard portion of a circular opening extending through the casing 37, while the backstop elements 43 are disposed in an adjacent portion of said circular opening defined by the sleeve 61. An oil collecting trough 67 inside the gear casing, is connected by way of passage 64 and a hole 63 respectively in and through the outer sleeve 61, with the block-springs receiving cartridge chamber. The end plate 62 has a thickened outer portion or rim 65 and holes 66 for the flow of oil to the bearing 38. It will be noted that the oil holes 66 are located outside of the surfaces defining the back-stop chamber so that such surfaces are not interrupted in any manner, tests having shown that any interruption of such surface may trip the blocks into locking position so that the block edges 43a and 43b are pressed on the relatively moving surfaces of the block chamber and cause wear or seizure of the blocks on such surface.

Figure 6:
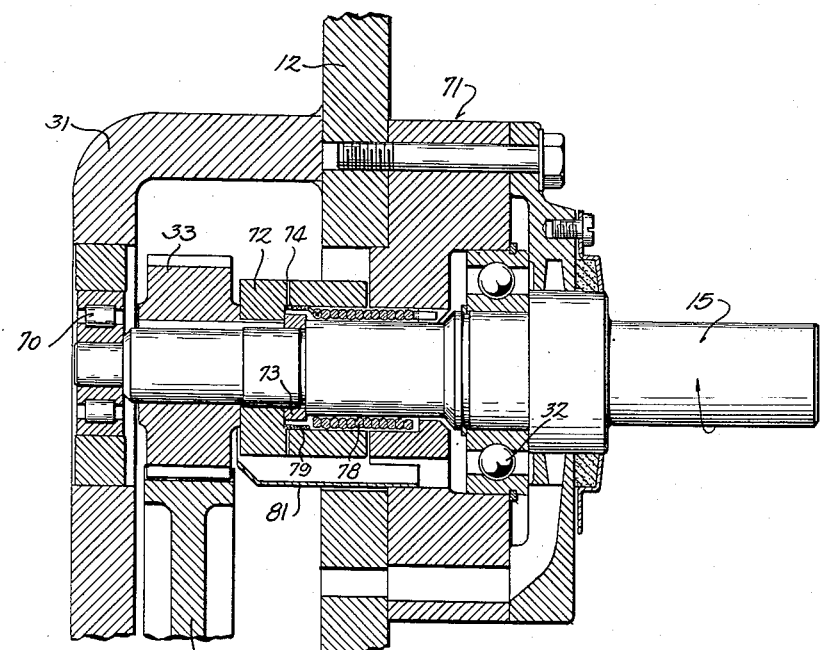
Fig. 6 is a view similar to Fig. 2 of a third embodiment of the back-stop.
Figure 7:
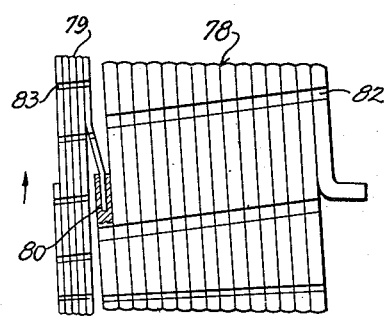
Fig. 7 is an elevational view of a portion of the device shown in Fig. 6.

Referring now to Figs. 6 and 7, the gear set partially illustrated therein is a triple reduction rather than double production gear set as shown in Fig. 1, the sets being otherwise, however, the same. Gear 33 is now mounted on shaft 15 between the gear housing end wall 12 and the bracket 31, and bearing 32 is replaced by a heavier duty bearing 70. The back-stop casing 71 is now substantially annular and provides only a portion of the chamber for the shaft locking or stopping means. The remainder of such chamber is formed by a sleeve 72 keyed on shaft 15 and extending in spaced relation over the shaft toward casing 71. The sleeve is held in endwise spaced relation to the casing 71 by a ring 73 acting between the sleeve and a shoulder on the shaft. The sleeve is provided with passages 74 of which the purpose will be explained hereinafter.

In the present construction, the shaft locking means comprises helical springs 78 and 79 (see Fig. 7) of widely different sizes in their several turns and of different lengths. The springs are joined at adjacent ends as shown at 80 in Fig. 7, so that the action of one spring is substantially immediately transmitted to the other spring. Spring 78 is fixed at one end of the casing 71 and is of such length as to extend along a surface of the casing and a portion of the surface of shaft sleeve 72. Such spring has an internal diameter such that the spring is slightly spaced from the surface of shaft 15. The outer surface of spring 78 is also spaced slightly from the adjacent surfaces of casing 71 and sleeve 72 so long as shaft 15 rotates only in a given direction. Spring 79 has such internal diameter as to be materially spaced from ring 73 and an outer diameter such that the spring is in light sliding contact with a surface of sleeve 72.

A passage is formed in casing 71 at the lower portion thereof where it extends into an opening in the housing fixed end wall 12 and a trough 81 is fixed in such passage for extension adjacent gears 33 and 27 for the purpose of catching splashed lubricant and conducting such lubricant to the bearing 38. Some of the lubricant will enter the spring chamber formed by shaft 15, casing 71 and sleeve 72 but the lubricant content of such chamber is kept relatively low by the pumping action of the passages 74 extending radially through the sleeve. It will be seen in Fig. 7 that springs 78 and 79 are provided with grooves 82 and 83, respectively, across the exterior surfaces of such springs for distributing lubricant throughout the spring chamber.

In operation of the present embodiment of the back-stop, so long as shaft 15 turns clockwise the torque on springs 78 and 79 is such that the turns of the several springs are seated on one another and spring 79 slides in sleeve 72 with but little friction. However, if the shaft rotation is reversed, sleeve 72 acts to unwind and expand the spring which in turn unwinds spring 78 and causes the latter spring also to expand. Expanding of spring 79 grips both the shaft mounting sleeve 72 and the fixed casing 71 and prevents reverse rotation of the shaft 15.

It will thus be seen that the present invention provides a reverse rotation-preventing mechanism or backstop which is readily applicable to even relatively small size gear sets and which is so combined with the gear set as to make use of a number of the usual parts of the gear set itself. Hence, the entire assembly is reduced to a small number of parts as compared to the usual gear set and back-stop combination, and the overall external dimensions of the gear set are not increased. All the present back-stop mechanisms are as durable and reliable as the gear set itself and do not add any unfavorable factors to such set. All the present back-stop modifications are easily manufactured as a unit which may be quickly assembled with gear sets either during the manufacturing process or after the sets are already in use. The modified form (Fig. 5) of the first embodiment is particularly advantageous as being simple and easily manufactured to the clearances which have been found by test, to be desirable in the constructions herein disclosed.

Although but two embodiments of the present invention have been illustrated and described, it will be apparent that various changes and modifications may be made therein without departing from the invention as defined in the appended claims.

I claim:

1. In a mounting and backstop unit for a shaft, a support having an aperture therein, a shaft journalled at one end in said support, said unit comprising a unitary casing having a circular opening therein to receive the other end of said shaft, means for fixedly anchoring said casing in the aperture in said support with said casing opening substantially aligned with the journalled one end of said shaft, a shaft-supporting bearing seated in one portion of said casing opening, and a backstop mechanism in another adjacent portion of said casing opening for coaction with the internal surface thereof and with said shaft to hold said shaft against rotation except in one direction, said bearing being disposed outboard of and adjacent said backstop mechanism and reacting through said shaft to effect and accurately maintain a concentric relation between said shaft, said backstop mechanism and said internal surface of said other portion of said casing opening.

2. In a mounting and backstop unit for a shaft, a support having an aperture therein, a shaft journalled at one end in said support, said unit comprising a unitary casing having a circular opening therein to receive the other end of said shaft, means for fixedly anchoring said casing in the aperture in said support with said casing opening substantially aligned with the journalled one end of said shaft, a shaft-supporting bearing seated in one portion of said casing opening, and a backstop mechanism in another adjacent portion of said casing opening for coaction with the internal surface thereof and with said shaft to hold said shaft against rotation except in one direction, said bearing being disposed adjacent said backstop mechanism and reacting through the otherwise radially free adjacent portion of said shaft to effect and accurately maintain a concentric relation between said shaft, said backstop mechanism and said internal surface of said other portion of said casing opening.

References Cited in the file of this patent

UNITED STATES PATENTS

| Number | Name | Date |
|---|---|---|
| Re. 13,682 | Day et al. | Feb. 3, 1914 |
| 1,356,486 | Carrow | Oct. 19, 1920 |
| 1,827,720 | Lamb | Oct. 13, 1931 |
| 1,870,532 | Schuetz | Aug. 9, 1932 |
| 1,963,466 | Jury | June 19, 1934 |
| 1,995,288 | Acker | Mar. 26, 1935 |
| 2,023,961 | Leichsenring | Dec. 10, 1935 |
| 2,123,202 | Rauen | July 12, 1938 |
| 2,151,250 | Warwick | Mar. 21, 1939 |
| 2,154,212 | Moorhouse | Apr. 11, 1939 |
| 2,166,512 | Warwick | July 18, 1939 |
| 2,299,765 | Rauen | Oct. 27, 1942 |
| 2,366,842 | Dodge | Jan. 9, 1945 |
| 2,368,963 | Boden | Feb. 6, 1945 |
| 2,388,424 | Lund | Nov. 6, 1945 |
| 2,408,179 | Schuetz et al. | Sept. 24, 1946 |
| 2,427,120 | Blair | Sept. 9, 1947 |
| 2,486,262 | Davis | Oct. 25, 1949 |
| 2,486,603 | King | Nov. 1, 1949 |
| 2,613,774 | Neracher et al. | Oct. 14, 1952 |